Aug. 11, 1964   E. L. CONNELL   3,144,240
TRACTOR FOR DUCT CRAWLER
Original Filed Sept. 17, 1956   2 Sheets-Sheet 1
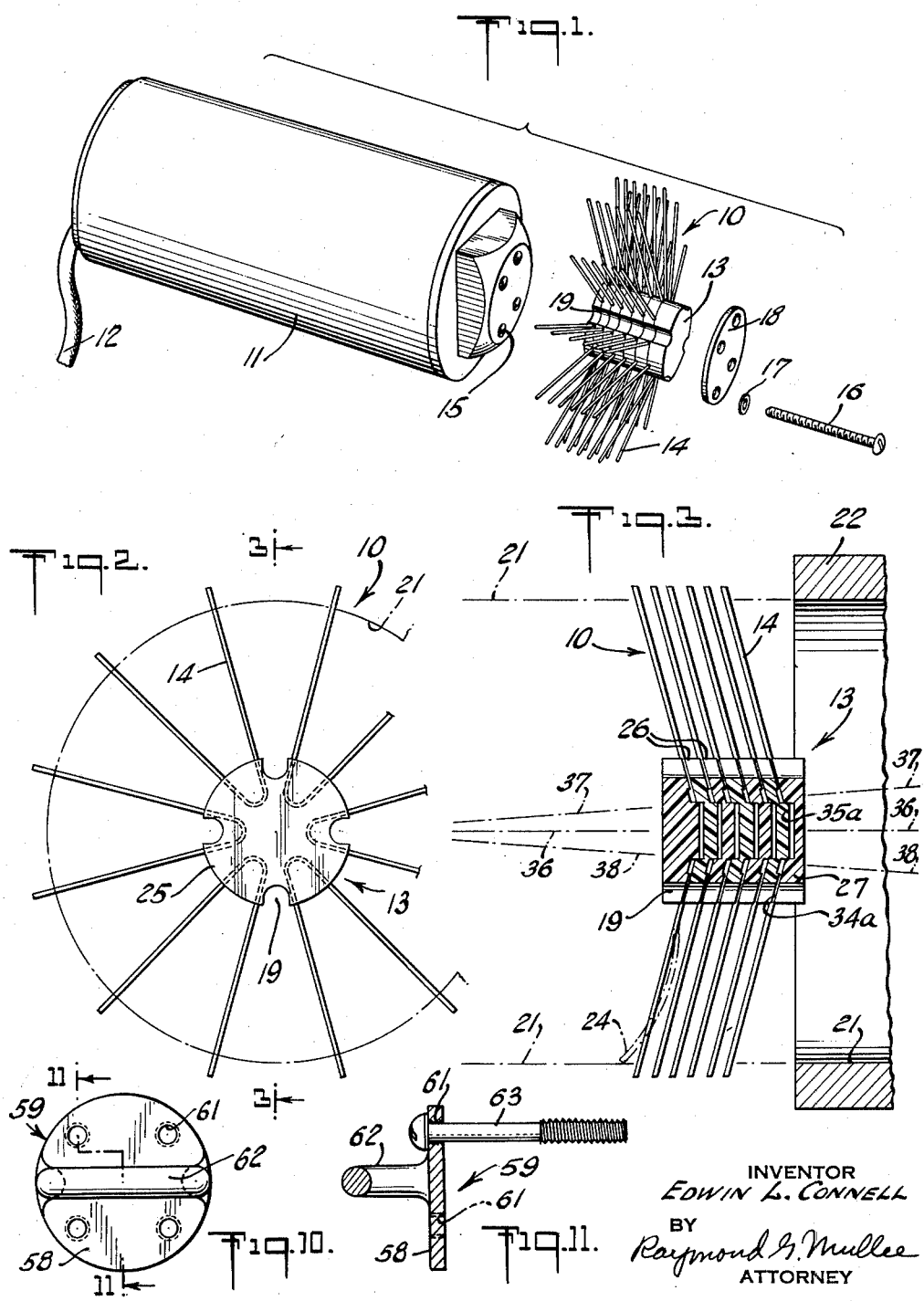
INVENTOR
EDWIN L. CONNELL
BY Raymond G. Mullee
ATTORNEY Aug. 11, 1964    E. L. CONNELL    3,144,240
TRACTOR FOR DUCT CRAWLER
Original Filed Sept. 17, 1956    2 Sheets-Sheet 2
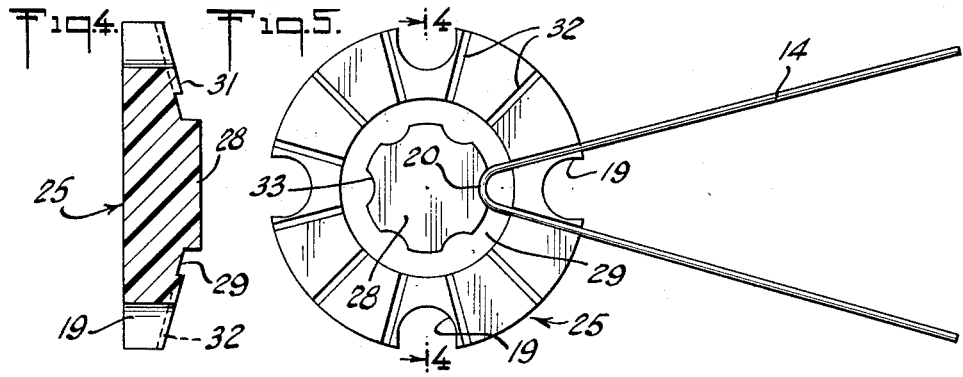
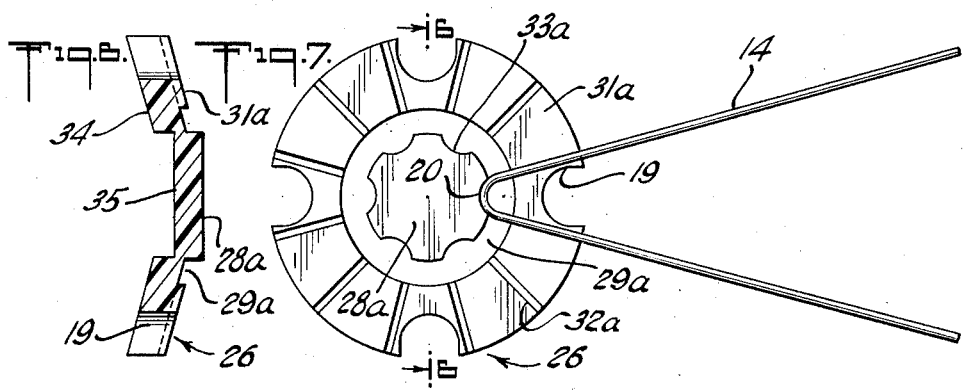
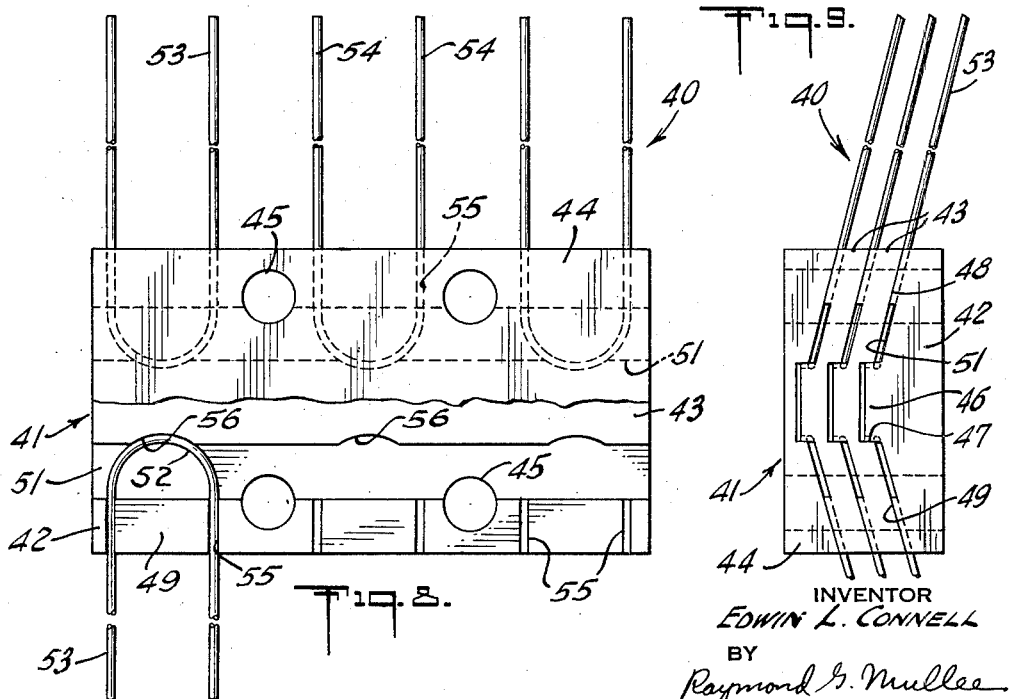
INVENTOR
EDWIN L. CONNELL
BY
Raymond G. Mullee
ATTORNEY 3,144,240
TRACTOR FOR DUCT CRAWLER
Edwin L. Connell, Utica, N.Y., assignor to Chicago Pneumatic Tool Company, New York, N.Y., a corporation of New Jersey
Continuation of application Ser. No. 610,354, Sept. 17, 1956. This application July 16, 1962, Ser. No. 211,934
19 Claims. (Cl. 254—134.5)

This application is a continuation of my pending application Serial Number 610,354, filed September 17, 1956.

This invention relates to duct crawlers and more particularly to a tractor adapted to propel the crawler assembly through a pipe or conduit. Such crawlers are used, for example, in pulling a wire through an underground duct or pipe about three inches in diameter, in order that the wire thus threaded through the pipe may be used in a preliminary step in the process of drawing a heavy power cable from one end of the pipe to the other.

It is known in this art to support a vibrator at each end upon a tractor which consists of a core and a large number of wires or tines radiating outwardly from the core, the tines having a slight tilt in one direction and engaging the inner wall of the duct to propel the assembly in the opposite direction in response to the vibrations. Heretofore, such tractors have been expensive to make owing to the care required in accurately placing a very great number of tines each in a different position and providing them with the needed support against operating thrusts.

An object of this invention is to simplify the construction and reduce the manufacturing cost of a tractor of this type.

Another object is to increase the operating speed, minimize breakage and service problems, and prolong the life of the tractor.

A further object is the provision of an improved support for the tines which will locate them accurately and sustain them in their respective positions against inward thrusts which otherwise would tend to move the tines inwardly and cause the tractor to lose diameter. A feature of the invention is an arcuate groove in the core which engages the bent portion of a pair of tines to act as a saddle support.

Another feature of the invention resides in a novel method of manufacturing and assembling the parts of the tractor which produces a uniformly high quality of workmanship with a minimum of skill and attention required by the workers in making the tractors.

Other objects and features of the invention will appear more fully from the following description taken in connection with the accompanying drawings and appended claims.

In the accompanying drawings:

FIG. 1 is an exploded view in perspective showing a preferred form of tractor embodying the invention, in association with a vibrator and attaching means;

FIG. 2 is an enlarged view in elevation of the rear end of the tractor looking from the left in FIG. 1;

FIG. 3 is a longitudinal section of the tractor as indicated by the arrows 3 in FIG. 2, showing also a fragmentary portion of a duct;

FIG. 4 is a longitudinal section on a still larger scale of a convex plate which forms the rear end section of the core of the tractor;

FIG. 5 is an elevational view of the front face of the convex plate shown in FIG. 4, in association with one pair of tines supported by the core;

FIG. 6 is a longitudinal section, on the same scale as FIG. 4, of one of the insert plates which form sections of the tractor core;

FIG. 7 is an elevational view of the front face of the insert shown in FIG. 6, in association with one pair of tines supported by the core;

FIG. 8 is a fragmentary front view in elevation of a modified tractor designed for operation in square ducts;

FIG. 9 is an end view of the modified tractor looking from the right in FIG. 8.

FIG. 10 is an elevational view of the rear face of a bail adapted for attachment of a wire to the rear end of a core such as shown in FIG. 3 or FIG. 9; and FIG. 11 is a longitudinal section as indicated by the arrows 11 in FIG. 10.

Referring to FIG. 1, the preferred form of tractor 10 is designed to be attached to the front end of a vibrator 11. A similar tractor (not shown) may be attached to the rear end of the vibrator, which pulls the electric conductor 12 and is powered therethrough. Tractor 10 comprises a cylindrical core 13 and a plurality of sets of tines 14 radiating therefrom. Any suitable fastening means may be provided for securing the core 13 rigidly to the housing of the vibrator 11. As shown, the front end of the vibrator housing is provided with four threaded holes 15 to receive screws 16 (only one shown). Each screw extends through a lock washer 17, a retainer washer 18 and a lateral groove 19 in the core 13, thus holding the vibrator and core rigidly together, whereby the vibrations of the vibrator housing are imparted to the core.

Each pair of tines 14 is made of music wire bent to the shape of a hairpin. It comprises two straight outwardly diverging arms or tines connected by a bight portion 20 (FIGS. 5 and 7). The tines are arranged in sets axially spaced from each other; for example, six sets as shown in FIG. 3. The tines in each set are circumferentially arranged, for example, as shown in FIG. 2 with six pairs of tines spaced 60° apart about the circumference of a set. Preferably, the tines in one set are aligned lengthwise of the core 13 with the tines of the other five sets. Each tine is located in a conical area which extends approximately radial but which is tilted outwardly and rearwardly, for example, by an angle of 15° as shown in FIG. 3. The free ends of the tines 14 engage the inner wall 21 (FIGS. 2 and 3) of a duct 22 (FIG. 3) at seventy-two widely spaced points thus providing a firm but flexible support for the core 13. The two tractors 10 in turn provide a flexible support for the vibrator 11 at the opposite ends thereof. Preferably, the tine assembly which forms the tractor has a diameter slightly in excess of the diameter of the duct bore 21 (for example 4 5/16" as compared with 4"), so that the tractor must be forced into the duct to put the tines under flexible tension. In the tensioned condition shown by the broken lines 24 in FIG. 3, the tines 14 are bent or warped out of the plane of the inner or bight portion 20.

The present invention provides a novel arrangement for supporting the tines in assembled relation and for sustaining them against the various operating thrusts. For this purpose, the core 13 (FIG. 3) is built up in the form of sections including a rear plate 25, five insert plates 26 and a front plate 27. The first or leading set of tines is clamped between the front plate 27 and the first insert plate 26. The next four sets are clamped by the insert plates. The last or trailing set is clamped by the last insert and the rear plate 25. Referring particularly to FIGS. 4 and 5, the rear plate 25 is generally of convex shape having at its front face a boss 28 surrounded by an annular groove 29, which in turn is surrounded by a frusto-conical face 31. The rear face of the plate 25 lies in a radial plane and is adapted to abut against the front end of the vibrator 11. The frusto-conical face 31 inclines outwardly and rearwardly at an angle of 15°, corresponding to the rearward tilt of the tines 14 as aforementioned. Radial grooves 32 are cut into the conical face 31 to receive the inner portions of the straight sides of the tines 14. Preferably, the grooves are cut at the same angle as the tines; for example 30°, whereby the tines may be inserted into the grooves without being placed under stress. The grooves 32 are approximately equal in width and depth to the tines. The bight portion 20 of the pair of tines projects into the annular groove 29. The boss 28 is recessed to provide saddle portions 33, each being of arcuate shape to fit the bight portion 20 of the associated pair of tines. The saddle portions constitute an important feature of this invention as they provide seats to support the tines against inward thrust. Such seats do not engage the entire bent portion or bight 20 of the pair of tines, inasmuch as the annular grooves 29 leave a space in which the curved or diverging sides of the pair of tines are unsupported. The advantage of the grooves 29 is that they permit the radial grooves 32 to be cut straight and the saddle grooves 33 to be cut as a regular arc and still provide a perfect fit with each pair of tines notwithstanding slight irregularities in curvature at the junction of the straight and curved portions of the tines.

Immediately in front of the rear plate 25 is one of the inserts 26, shown best in FIGS. 6 and 7. The insert is generally of concavo-convex shape having on its rear face a dished surface 34 complementary in shape to the face 31 and in abutting engagement therewith. The face 34 also covers the tines 14 and cooperates with the grooves 31 and saddle portions 33 to hold the inner ends of the tines securely against movement relative to the core 13. Lying within the dished surface 34 is a bore 35 equal in diameter to the boss 28 and adapted to receive the latter with a snug fit, the bore being somewhat greater in depth than the boss as shown in FIG. 3. The front face of the insert plate 26 is provided with a boss 28a, annular groove 29a, frusto-conical face 31a, radial grooves 32a, and saddle recesses 33a, similar in structure and function to the elements 28, 29, 31, 32 and 33 respectively in the rear plate 25, and adapted to cooperate with another set of tines 14 and another insert 26. In a like manner, the front plate 27 is provided with a dished portion 34a and bore 35a (FIG. 3) corresponding to the elements 34 and 35 respectively at the rear face of the insert plate 26.

The method of making and assembling the tractor 10 will now be described. Each of the insert plates 26 and end plates 25 and 27 is composed of a suitable plastic material, for example "Butyrate," which is marketed by Eastman Kodak Company. Each of said plates is molded separately in a conventional manner. One set of tines 14 is inserted into the radial grooves 32 on the convex face of the rear plate 25. The front face of said plate is then coated with a suitable adhesive which is applied by a brush to the conical surface 31 and the cylindrical surface of boss 28. The same adhesive is painted on the complementary dished and cylindrical surfaces 34 and 35 respectively on the adjacent insert 26; and the two plates 25 and 26 are brought into contact and pressed together manually. This operation is repeated to build up the core section by section. In each instance, the workman should see that the grooves 19 line up but he need not pay special attention to the coaxial alignment as the sections cannot be nested together otherwise. After the seven plates or sections have been provisionally assembled in this manner, the core is inserted in a mechanical press to hold the plates in tight engagement so as to enable the adhesive to firmly bond the several plates to one another. Thereafter, the core assembly 13 is immersed in a bath of rubber cement which fills up the crevices between the plates. Following submersion the tractor assembly 10 is removed from the bath whereupon the rubber cement dries and lends a smooth appearance to the core 13. The tractor is then in condition to be secured to the front end of the vibrator 11 as heretofore described.

In operation, the tractor assembly is inserted manually into the starting end of the duct 22 which reacts against the tines 14 to bow them slightly from the free portion shown in full lines in FIG. 3 to the buckled position represented by the broken lines 24 in the same figure. After the assembly is fully inserted, the vibrator 11 lies coaxial with the duct 22 in spaced relation, being supported firmly but resiliently at its front end by the tractor 10 and at its rear end by a similar tractor (not shown). Electric current is then supplied through the conductor 12 to operate the vibrator. By means of a conventional arrangement, including a motor and unbalanced weights (not shown) the vibrator is caused to move through a circle at each end, carrying with it the vibrator cores 13 which are rigidly secured to the ends of the vibrator housing. The axis of the vibrator and cores shifts from its normal position, indicated by the broken line 36 in FIG. 3, to a circular series of off-normal positions two of which are indicated by the broken lines 37 and 38 in the same figure. The path taken by the shifting axis of the core 13 generates the surface of a cone whose apex lies near the middle of the vibrator 11. When the axis shifts to the line 38 position, the tines 14 tend to partake of the clockwise movement of the core 13, as viewed in FIG. 3. During such movement of the core, the upper tines are permitted to advance along the duct 22 toward the right of FIG. 3 but the lower tines cannot move to the left as the free ends of the tines dig into the wall of the duct 22 in the manner of a ratcheting device. Instead, the lower tines become buckled or bowed to a greater extent than previously and when the axis shifts again the buckled tines unbend to advance the core 25 and vibrator assembly further to the right. Upon shifting of the axis to the position of line 37, the core 13 moves counterclockwise and the upper tines dig in while the lower tines advance. The result is a crawling action of the tines 14 which carry the vibrator 11 at a considerable speed along the duct, in practice at the rate of about one hundred forty feet per minute. The vibrators 11 may be used to pull a wire (not shown) through the duct 21, the wire being attached either directly or through the conductor 12.

From the foregoing description, it will be seen that the tines in operation are subject to very great stress in a direction radially inward of the core. The saddle grooves 33 and 33a sustain such thrusts and prevent the tine assembly from losing diameter.

The tractor (not shown) at the rear end of the vibrator 11 is identical in construction with the tractor 10 and has its tines inclined in the same direction, but it is connected with its front end 27 abutting the vibrator housing. The rear tractor operates in essentially the same manner as the front tractor 10 except that it pushes rather than pulls the vibrator 11. It may, however, be attached to a hook (not shown) for pulling a cable. The vibrator 11 may be provided with suitable means, such as a weight (not shown) to prevent the vibrator and tractors from rotating about the axis of the duct.

FIGS. 8 and 9 show a modified tractor designed for operation on square or rectangular ducts. The modified tractor 40 comprises a core 41 which is built up in sections comprising a rear end plate 42, two inserts 43 and a front end plate 44. The plates or sections are of rectangular shape and are provided with four sets of aligned holes 45 to receive the screws 16 which rigidly attach the core to the housing of the vibrator 11. As seen in FIG. 9, the rear (right) face of the rear plate 42 is flat and adapted to abut against the front end of the vibrator housing while the front (left face of the front plate 44 is adapted for engagement with the retaining washer 18. The front face of the rear plate 42 has centrally disposed tongue 46 which is slightly tapered to fit a complementary tapering longitudinal groove 47 in the adjacent insert 43. Above and below the groove 47, the rear face of each insert 43 consists of flat sides 48 which lie in planes inclined 15° from the vertical and converging forwardly. The front face of the rear plate 42 has flanks 49 complementary to, and fitting with, the flat sides 48, said flanks being separated from the tongue 46 by means of a pair of longitudinal recesses 51. Lying within the recesses 51, are the bight portions 52 of a set of upper and lower tines 53. Any suitable number of tines may be provided (for example three upper and three lower sets as shown in FIG. 9 with three pairs of tines to a set as shown in FIG. 8). Each pair of tines comprises a pair of parallel arms 54, the inner portions of which lie within vertical grooves 55 formed in the flanks 49, said arms being connected by a bight portion 52. As in the case of the first embodiment of invention, the tines may be made of music wire having a diameter substantially equal to the depth of the vertical grooves 55, the inner portions of the arms 54 being tightly clamped between the adjacent sections and the core 41. The bight portions 52 seat respectively against arcuate recesses 56 at the top and bottom of the tongue 46, each of said recesses providing a saddle portion to support the tines against inward thrust. The remaining sections of the core 41 are connected together in the same manner to provide support for additional sets of tines 53.

The method of making the modified tractor 40 is the same as in the case of tractor 10 and need not be restated. The mode of operation is the same as that of tractor 10 except that the tines 53 engage opposite walls of a non-circular duct which are spaced apart a distance slightly less than the normal distance between the top and bottom of the tractor when not in position.

If desired, the tractor 40 may be attached to a similar tractor (not shown), to define a double cored tractor with the front end plate 44 of one core in a tractor abutting the rear end plate 42 of the other, the two cores 41 being arranged with the holes 45 in registry to receive a common set of screws 16, but extending at right angles to each other so that the tines 53 of one tractor engage the upper and lower walls of the duct while the tines of the other tractor engage the side walls of the duct.

As stated previously, the crawler assembly comprises a vibrator 11 and two tractors of similar or identical construction supporting the opposite ends of the vibrator. In the case of the tractor 10 or 40 which is attached to the rear end of the housing of vibrator 11, the retaining washer 18 is omitted and the front plate 27 or 44 of the core 13 or 41 is arranged in abutting engagement with the rear end of the vibrator housing. Abutting against the rear plate 25 or 42 of the core is the disk portion 58 of a bail 59 shown in FIGS. 10 and 11. The disk portion is provided with four holes 61 adapted to register with the lateral grooves 19, or the holes 45 as the case may be, and to receive a set of screws 63 for attaching the bail and core as a unit rigidly to the housing of vibrator 11. Cast integrally with the disk 59 is an eyelet portion 62, in the shape of a half torus, which is adapted to receive a hook or link (not shown) for pulling a rope or wire through the duct.

What is claimed is:

1. A tractor for a duct crawler comprising a plurality of flexible tines, engageable at spaced points with the inner wall of the duct to react against said wall and thus propel the tractor, said tines being arranged in spaced sets, and a core for supporting the inner ends of the tines, said core being composed of an axial succession of plates, each plate in the order of succession having an annular broad rear face and a boss projecting centrally therefrom and each plate having a complementary annular broad forward face contacting the rear face of the preceding plate, and a complementary recess centrally of the forward face in which the boss of the preceding plate is nested, each set of tines being supported at the inner end portions thereof between the faces of two adjacent plates, there being in one of the faces of the latter a group of radial grooves each groove being individual to the inner portion of one of the tines and having a depth dimension complementing the thickness of the tine, the external portions of the tines in each set being spaced circumferentially from the neighboring tines of the set and aligned longitudinally with a similarly positioned tine in each of the other sets of tines, each tine in a set representing one arm of a pair of tines having a curved bight portion connecting the inner ends of the arms of the pair of tines, and each boss having a plurality of spaced arcuate depressions each defining a saddle in which the bight portion of a pair of tines is seated whereby each tine is individually supported against inward thrusts.

2. In a self-propelled duct crawler, a tractor according to claim 1, in which the plates are made of plastic material and which adjacent plates are joined together with adhesive.

3. A tractor as defined in claim 1, in which the external portions of the tines in each set lie in a common conical plane.

4. A tractor for a duct crawler comprising a core having means for attachment to a vibrator and adapted to be positioned longitudinally of a duct, a plurality of flexible tines extending outward from said core and engageable at spaced points with the inner wall of the duct to react against said wall and thus support and propel the tractor, said tines being arranged in sets, each set being spaced longitudinally from adjacent sets, the tines in each set having their inner ends in a common plane transverse to the duct, the outer ends of the tines in said set lying in a second plane which is parallel to but rearward of the first plane, said core being composed of an axial succession of plastic plates, interconnected in face to face contact one with the other, each plate in the order of succession having a central axial boss and each plate having a recess in which the central boss of the preceding plate is nested, the tines in each set being individually confined at their inner ends in individual slots preformed in the face of one of the adjacent plates, and the external portions of the tines in each set being spaced substantially one from the other.

5. A tractor according to claim 4, in which each tine in a set represents an arm of a pair of tines having a curved bight portion joining their inner ends, and the boss has a plurality of spaced curved seat supports therein each providing a separate saddle in which the bight portion of a pair of tines is seated, whereby each tine is individually supported against inward thrusts.

6. In a self-propelled duct crawler, a tractor comprising a core, a plurality of pairs of flexible tines extending outwardly and rearwardly from said core, each pair of tines being of approximately hairpin shape and comprising two arms connected by a curved bight portion, the extremities of the arms being engageable with the inner wall of the duct, the core having an arcuate groove associated with each pair of tines, said groove fitting the bight portion of the pair of tines to provide a saddle to sustain inward thrust on the tines.

7. In a self-propelled duct crawler, a tractor comprising an axial succession of a plurality of plates arranged in contact with each other, each plate having a projection fitting in a recess of the adjacent plate to assure axial alignment of the plates, said plates being adapted to be held together to form a core, a plurality of sets of flexible tines extending outwardly from the core and engageable at their extremities with the inner wall of the duct, adjacent surfaces of the plates being in contact with each other, a plurality of grooves formed between the contacting surfaces of the plates, each groove being individual to an inner end portion of a separate one of the tines and having a depth dimension complementing the thickness of the tine, each tine having an inner end portion abutting the associated projection, the contacting faces of the plates being inclined in a conical surface, and the tines projecting from between said plates being inclined in parallel relation to said surface.

8. In a self-propelled duct crawler of the character described, a tractor assembly comprising an axial succession of plastic plates nested one to the other, a group of individual flexible tines projecting in spaced relation to each other from between adjacent plates, adhesive means bonding the adjacent plates to one another, a rubber cement coating over the entire surface of the plastic plates and the surfaces of the tines, and channels in the surfaces of the plates adapted to accommodate means for securing the tractor assembly to a vibrator.

9. A tractor for a duct crawler, comprising a plurality of flexible tines engageable at spaced points with the inner wall of the duct to react against said wall and thus propel the tractor, said tines being arranged in spaced sets, a core for supporting the inner ends of the tines, said core being composed of an axial succession of plates, each plate in the order of succession having a rear annular face and a boss projecting centrally therefrom and each plate having a forward annular face contacting the rear face of a preceding plate and a complementary recess in which the boss of the preceding plate is received, each set of tines being supported at the inner end portions thereof between two adjacent plates, an inner end portion of each tine in each set being confined in a preformed individual radial slot in the annular face of one of the plates and each tine having its external portion spaced substantially from the neighboring tines of the set and aligned with a similarly positioned tine in each of the other sets of tines; wherein each tine in a set represents one arm of a pair of tines having a curved bight portion connecting the inner ends of the arms of the pair of tines, and wherein the arms of the pair of tines diverge to form a V-shaped structure, the tines in each set being arranged at substantially equal angular distances from each other and lying in a common conical surface.

10. A tractor for a duct crawler, comprising a plurality of flexible tines engageable at spaced points with the inner wall of the duct to react against said wall and thus propel the tractor, said tines being arranged in spaced sets, a core for supporting the inner ends of the tines, said core being composed of an axial succession of plates, each plate in the order of succession having a rear annular face and a boss projecting centrally therefrom and each plate having a forward annular face contacting the rear face of a preceding plate and a complementary recess in which the boss of the preceding plate is received, each set of tines being supported at the inner end portions thereof between two adjacent plates, an inner end portion of each tine in each set being confined in a complementary individual radial slot preformed in the annular face of one of the plates and each tine having its external portion spaced substantially from the neighboring tines of the set and aligned with a similarly positioned tine in each of the other sets of tines, in which tractor each tine in a set represents one arm of a pair of tines having a curved bight portion connecting the inner ends of the arms of the pair of tines, the arms of a pair of tines are approximately parallel to form a U-shaped structure, and in which the tines in each set lie in a common plane.

11. A tractor for a duct crawler, comprising a plurality of flexible tines engageable at spaced points with the inner wall of the duct to react against said wall and thus propel the tractor, said tines being arranged in spaced sets, a core for supporting the inner ends of the tines, said core being composed of an axial succession of plates, each plate in the order of succession having a rear annular face and a boss projecting centrally therefrom, and each plate having a forward annular face contacting the rear face of a preceding plate and a complementary recess in which the boss of the preceding plate is received, each set of tines being supported at the inner end portions thereof between two adjacent plates, an inner end portion of each tine in each set being confined in a complementary individual radial slot preformed in the annular face of one of the plates and each tine having its external portion spaced substantially from the neighboring tines of the set and aligned with a similarly positioned tine in each of the other sets of tines; in which tractor each tine in a set represents one arm of a pair of tines having a curved bight portion connecting the inner ends of the arms of the pair of tines, there is provided an annular groove below the slots in the related annular face portion of a plate, and the curved bight portion projects below the slots across the annular groove, and there being individual to each pair of tines a curved seat in the surface of the related boss in which the bight portion is seated.

12. A plate adapted in assembled end to end relation with a plurality of similar plates to form the core of a duct crawler, said plate comprising an annular body of dished configuration having a central annular base portion, an outer annular portion integral with and surrounding the base portion and inclined relative thereto, the outer portion having a pair of end faces one of which has a smooth surface and the other of which is interrupted by a ring of radially extending grooves, the base portion projecting axially at one end relative to one of said end faces and having an axial recess in its opposite end of a diameter complementing that of the said projecting end and of a depth slightly greater than the length of the projecting end, and each of said grooves opening at one end through the peripheral edge of the plate and adapted to receive therein an end portion of a flexible tine of complementary cross sectional dimension; wherein an annular channel in the body of the plate separates the grooved face from the projecting end of the base, each groove opens at its inner end into said channel, the grooves are arranged in angularly spaced pairs, and a separate concaved saddle formed in the periphery of the projecting end of the base and centered relative to each pair of grooves, each groove of a pair being adapted to receive an inner end portion of a tine, and the associated saddle being adapted to have seated therein a complementary bight defined by the end portions of a pair of tines.

13. A plate as defined in claim 12, having a plurality of channels transversely of its periphery, each channel being adapted to have received therein a complementary portion of the shank of an elongated tie-bolt.

14. A tractor for a duct crawler comprising a core having means for attachment to a vibrator and adapted to be positioned longitudinally of a duct, a plurality of flexible tines extending outwardly from said core and engageable at spaced points with the inner wall of the duct to react against said wall and thus support and propel the tractor, said tines being arranged in sets, each set being spaced longitudinally from adjacent sets, the tines in each set having their inner ends in a common plane transversely of the core, the outer ends of the tines in said set lying in a second plane which is parellel to but rearward of the first plane, said core being composed of an axial succession of plates, interconnected in face to face contact one with the other, the tines in each set being individually confined at their inner ends in individual slots, the slots being preformed in one face of each pair of contacting faces prior to assembly of the plates into a core and the slots having an axial depth equal to the diameters of the tines received therein.

15. In a self-propelled duct crawler, a tractor comprising an axial succession of a plurality of plates nested in face to face contact with one another, said plates being adapted to be held together to form a core, a plurality of sets of flexible tines extending outwardly from the core and engageable at their extremities with the inner wall of a duct, a plurality of grooves between the contacting surfaces of the plates preformed prior to assembly of the plates in only one of each pair of contacting surfaces, each groove being individual to an inner end portion of a separate one of the tines and having an axial depth dimension complementing the thickness of the tine, the contacting faces of the plates being inclined in a conical plane, and the tines projecting from between said plates being inclined in parallel relation to said plane.

16. In a self-propelled duct crawler, a tractor comprising a plurality of conical plates nested in face to face contact with each other, bolt means holding the plates together so as to form a core, a plurality of sets of flexible tines extending outwardly from the core and engageable at their extremities with the inner wall of a duct, one of each of said contacting faces provided with grooves in which the inner end portions of the tines have been fully received and lie in a slightly inclined plane parallel to the faces of the contacting plates and to the bottoms of the grooves, and said grooves being preformed in the face of the plate prior to the reception of the tines therein and prior to nesting of the plates with one another to form the core.

17. In a self-propelled duct crawler of the character described a tractor assembly comprising an axial succession of plates having parallel inclined end faces nested one to the other, a group of individual flexible tines projecting in spaced relation to each other from between adjacent plates in parallel relation to the inclined surfaces of the plates, adhesive means bonding the adjacent plates to one another, and there being holes extending axially through the several plates adapted to accommodate bolt means for securing the tractor assembly together as a unit.

18. A plate adapted in assembled face to face contacting relation with a plurality of similar plates to form the core of a duct crawler, said plate comprising an annular body of dished configuration having at one end thereof a smooth surfaced face and having in its opposite end a face interrupted by a ring of radially extending grooves preformed therein, each of said grooves having its bottom inclined parallel to the related surface of the plate and opening at one end through the peripheral edge of the plate, and an axial annular recess in the said grooved face with which recess the inner ends of all the grooves communicate, the grooves being arranged in angularly spaced pairs, each groove of a pair being adapted to receive an inner portion of one arm of a pair of flexible tines joined at their inner ends by a curved bight, each groove having an axial depth equal in diameter to the thickness of the arm of a tine to be received therein, and the annular recess adapted to receive the curved bight portion of a pair of tines that may be received in a pair of grooves, and rigid means disposed transversely of the center of the plate adapted to support the bight portion of each pair of tines that may be received in the grooves.

19. A plate as defined in claim 18, having a plurality of openings therethrough, each opening being adapted to have received therein a complementary portion of the shank of an elongated tie-bolt.

References Cited in the file of this patent

UNITED STATES PATENTS

| | | |
|---|---|---|
| 351,306 | Audaye | Oct. 19, 1886 |
| 479,397 | Broadley | July 26, 1892 |
| 549,557 | Volland | Nov. 12, 1895 |
| 558,855 | Stander | Apr. 21, 1896 |
| 1,009,335 | Olson | Nov. 21, 1911 |
| 2,148,982 | Erickson | Feb. 28, 1939 |
| 2,172,433 | Churchill | Sept. 12, 1939 |
| 2,241,845 | Chapman | May 13, 1941 |
| 2,296,514 | Gibson | Sept. 22, 1942 |
| 2,604,521 | Boucher | July 22, 1952 |
| 2,917,762 | Xenis | Dec. 22, 1959 |

FOREIGN PATENTS

| | | |
|---|---|---|
| 845,342 | France | May 8, 1939 |
| 614,592 | Great Britain | Dec. 17, 1948 |
| 1,101,518 | France | Apr. 20, 1955 |
| 775,106 | Great Britain | May 22, 1957 |